(12) United States Patent
Ferreira Moreno et al.

(10) Patent No.: US 12,086,145 B2
(45) Date of Patent: Sep. 10, 2024

(54) MAPPING MACHINE LEARNING MODELS TO ANSWER QUERIES

(71) Applicant: International Business Machines Corporation, Armonk, NY (US)

(72) Inventors: Marcio Ferreira Moreno, Rio de Janeiro (BR); Guilherme Augusto Ferreira Lima, Campinas (BR); Rafael Rossi de Mello Brandao, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 17/374,322

(22) Filed: Jul. 13, 2021

(65) Prior Publication Data

US 2023/0016157 A1   Jan. 19, 2023

(51) Int. Cl.
*G06F 16/2457* (2019.01)
*G06F 16/25* (2019.01)
*G06F 16/901* (2019.01)
*G06N 20/00* (2019.01)

(52) U.S. Cl.
CPC .. *G06F 16/24575* (2019.01); *G06F 16/24578* (2019.01); *G06F 16/258* (2019.01); *G06F 16/9024* (2019.01); *G06N 20/00* (2019.01)

(58) Field of Classification Search
CPC ......... G06F 16/24575; G06F 16/24578; G06F 16/258; G06F 16/9024; G06N 20/00
See application file for complete search history.

(56) References Cited

U.S. PATENT DOCUMENTS

| | | | |
|---|---|---|---|
| 7,231,383 B2 | 6/2007 | Andreev et al. | |
| 8,200,025 B2 * | 6/2012 | Woodbeck | G06V 30/242 706/20 |
| 8,751,218 B2 | 6/2014 | Dang et al. | |
| 10,474,949 B2 | 11/2019 | Majumdar et al. | |

(Continued)

FOREIGN PATENT DOCUMENTS

| | | |
|---|---|---|
| CN | 100485665 C | 5/2009 |
| EP | 3264338 A1 | 1/2018 |

OTHER PUBLICATIONS

Kulmanov, M., et al., "Semantic Similarity and Machine Learning with Ontologies", Briefings in Bioinformatics, Submitted May 7, 2020, pp. 1-18.

(Continued)

*Primary Examiner* — Cheyne D Ly
(74) *Attorney, Agent, or Firm* — Scully, Scott, Murphy & Presser, P.C.; Anthony Mauricio Pallone

(57) ABSTRACT

Automatically mapping and combining the application of machine learning models to answer queries according to semantic specification. A query is parsed to extract keywords from the query and to contextualize the query. Based on the keywords, machine learning models are selected that process concepts associated with the keywords. The machine learning models are sorted according to the contextualization of the query. The machine learning models are run on multimodal data according to a sorted order, where data resulting from an output of one of the machine learning models is used as input to another one of the machine learning models. A query result is output based on a result from running the machine learning models.

20 Claims, 9 Drawing Sheets

(56) References Cited

U.S. PATENT DOCUMENTS

| | | | |
|---|---|---|---|
| RE47,830 E | 1/2020 | Werth | |
| 10,585,991 B2 | 3/2020 | Miller et al. | |
| 10,930,272 B1 | 2/2021 | Orkin et al. | |
| 2013/0226930 A1* | 8/2013 | Arngren | G06F 16/71 707/741 |
| 2016/0110657 A1* | 4/2016 | Gibiansky | G06N 20/00 706/12 |
| 2016/0203221 A1* | 7/2016 | Rao | G06Q 50/01 707/707 |
| 2017/0090428 A1 | 3/2017 | Oohara | |
| 2017/0132528 A1* | 5/2017 | Aslan | G06N 20/00 |
| 2018/0082179 A1 | 3/2018 | Gredilla | |
| 2018/0101617 A1* | 4/2018 | Govindarajan | G06N 20/00 |
| 2019/0179940 A1* | 6/2019 | Ross | G06F 16/953 |
| 2019/0180443 A1* | 6/2019 | Xue | G06F 18/24143 |
| 2019/0391956 A1* | 12/2019 | Kozhaya | G06F 16/3329 |
| 2020/0202253 A1* | 6/2020 | Tamura | G06N 20/00 |
| 2020/0202256 A1* | 6/2020 | Chaudhari | G06N 20/20 |
| 2020/0272909 A1* | 8/2020 | Parmentier | G06N 3/126 |
| 2020/0364233 A1* | 11/2020 | Chan | G06F 16/9035 |
| 2022/0100809 A1* | 3/2022 | Lee | G06F 16/9538 |

OTHER PUBLICATIONS

Tamke, M., "Machine Learning for Architectural Design: Practices and Infrastructure", International Journal of Architectural Computing, Jun. 2018, pp. 1-25.

Shirwadkar, S., et al., "Method and System for Processing and Answering Factual Questions Over Structured Data", An IP.com Prior Art Database Technical Disclosure, IP.com No. IPCOM000258994D, IP.com Electronic Publication Date Jul. 2, 2019, 6 pages.

Anonymous, "Smart Structured Query Interface for Handling Complex Selectors Relying on Finding and Executing Machine Learning Models on Runtime", An IP.com Prior Art Database Technical Disclosure, IP.com No. IPCOM000256757D, IP.com Electronic Publication Date: Dec. 28, 2018, 6 pages.

Anonymous, "Ontology Based Query Correction Without Query Logs", An IP.com Prior Art Database Technical Disclosure, IP.com No. IPCOM000247799D, IP.com Electronic Publication Date: Oct. 6, 2016, 6 pages.

Lv, X., et al., "Clinical Relation Extraction with Deep Learning", International Journal of Hybrid Information Technology, 2016, pp. 237-248, vol. 9, No. 7.

Lehmann, J., et al., "DL-Learner: Learning Concepts in Description Logics", Journal of Machine Learning Research 10 (2009), Submitted May 2009, Published Nov. 2009, pp. 2639-2642.

Xu, J., et al., "A Semantic Loss Function for Deep Learning with Symbolic Knowledge", Proceedings of the 35th International Conference on Machine Learning, PMLR 80, 2018, 10 pages.

Publio, G.C., et al., "ML-Schema: Exposing the Semantics of Machine Learning with Schemas and Ontologies", arXiv:1807.05351v1, Jul. 14, 2018, 5 pages.

Dumas, B., et al., "Multimodal Interfaces: A Survey of Principles, Models and Frameworks", Lalanne D., Kohlas J. (eds) Human Machine Interaction, Lecture Notes in Computer Science, vol. 5440, 2009, 25 pages.

Eskevich, M., et al., "Hyper Video Browser: Search and Hyperlinking in Broadcast Media", MM'15, Oct. 26-30, 2015, pp. 817-818.

Guo, H., "Algorithm Selection for Sorting and Probabilistic Inference: A Machine Learning-Based Approach", Dissertation, Kansas State University, 2003, 256 pages.

NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

MAPPING MACHINE LEARNING MODELS TO ANSWER QUERIES

BACKGROUND

The present application relates generally to computers and computer applications, machine learning, automatic question answering, search engines, and more particularly to automatically mapping and/or combining application of machine learning models to answer queries according to semantic specification.

Currently, there is a lack of mechanisms to exploit symbolic representation and leverage the combination of multiple machine learning models to extract semantic information from multimodal content to answer users' queries. Specifically, current solutions try to index all the content and store both types of information in a database. Indexing in this case happens manually through human annotations or statically through an exhaustive application of models available to extract concepts that the models are capable of extracting regardless of from where these concepts are being extracted.

BRIEF SUMMARY

The summary of the disclosure is given to aid understanding of a computer system and method of automatically mapping and/or combining application of machine learning models to answer queries, e.g., according to semantic specification, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A system, in an aspect, can include a processor and a memory device coupled with the processor. The processor can be configured to receive a query. The processor can also be configured to parse the query to extract keywords from the query and to contextualize the query. The processor can also be configured to, based on the keywords, select machine learning models that process concepts associated with the keywords. The processor can also be configured to sort the machine learning models according to the contextualization of the query. The processor can also be configured to run the machine learning models on multimodal data according to a sorted order, where data resulting from an output of one of the machine learning models is used as input to another one of the machine learning models. The processor can also be configured to output a query result based on a result from running the machine learning models.

A computer-implemented method, in an aspect, can include receiving a query. The method can also include parsing the query to extract keywords from the query and to contextualize the query. The method can also include, based on the keywords, selecting machine learning models that process concepts associated with the keywords. The method can also include sorting the machine learning models according to the contextualization of the query. The method can also include running the machine learning models on multimodal unstructured data according to a sorted order, where data resulting from an output of one of the machine learning models is used as input to another one of the machine learning models. The method can also include outputting a query result based on a result from running the machine learning models in the sorted order.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
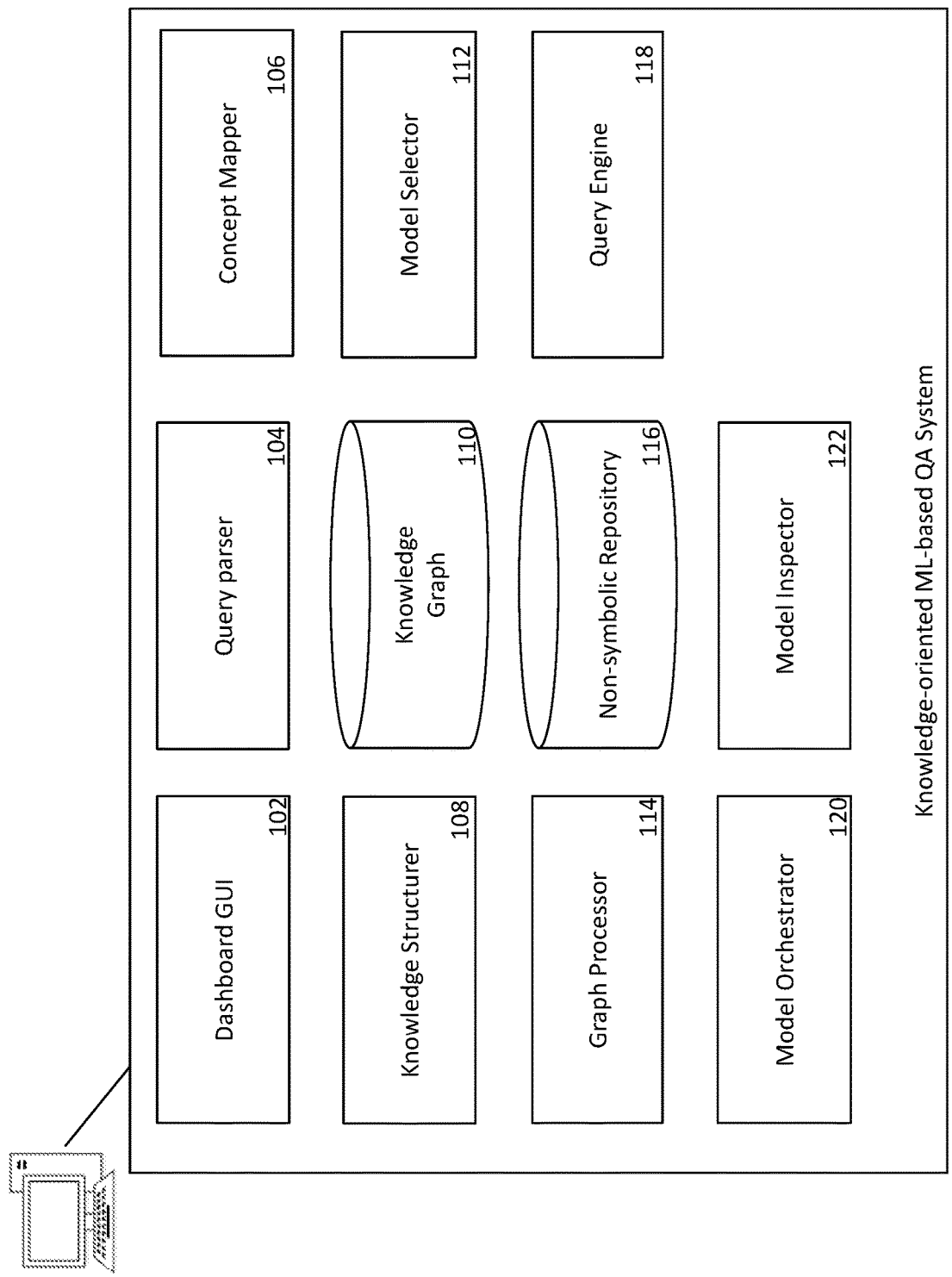
FIG. 1 is a diagram illustrating system architecture in an embodiment.

An artificial intelligence (AI) system and method, in one or more embodiments, can automatically map, contextualize, and combine the application of machine learning models to answer queries according to a semantic specification. The system and method can contextualize and semantically orchestrate machine learning (ML) models and relationships between multimodal data and symbolic conceptual labels, e.g., in answering a query. For example, the system can describe neural symbolic integration, specifying the entire ML workflows, including what each model consumes and produces through a knowledge representation. The system can infer the relationships through multimodal data and suitable models. The system can also process queries specified by users to extract symbolic conceptual content, leveraging another capability to map this semantic information into a selection of machine learning models. For example, the system can select, sort and apply a hierarchy of machine learning models on specific multimodal data and conceptual symbolic representations to dynamically index multimodal data fragments at query time.

In answering a query, a search or search engine in an embodiment of a system and/or method disclosed herein may consider hierarchy and contextualization in execution of information extraction mechanism. For instance, the search or search engine may extract meaning or semantics from the query, and consider a mapping between ML model capabilities and semantic description of the query.

The following illustrates some example scenarios. In the first example scenario, consider a user query for an image showing "XYZ mug", meaning that the user is searching for an image of a mug with a "XYZ" logo shown on the mug. In an embodiment, the system parses the query and determines that the user wants only images. It also knows that the user wants two concepts in these images. The system then looks for models capable of extracting XYZ logo or word from images and models capable of identifying mugs in images, in a contextualized way. That is, there is a hierarchy in the model selection and orchestration. For example, the system executes the mug identifier first in all the images that were not previously processed. Then, with the mug bounding boxes from these images, the system delivers these cropped images to the next model, which is the XYZ logo or word identifier. The system then presents the result through the dashboard. In this way, the search result can be more focused and accurate. For instance, in the above-described example, search results which may include both XYZ log and a mug, but in an uncontextualized manner (e.g., a document includes the word or logo "XYZ" but as a separate instance from an image, e.g., no logo in the image of the mug) can be eliminated.

The same logic can be applied to different domains. For example, in the second example scenario, a geoscientist queries the system looking for seismic images that contain a geological pattern called mini-basin, but specifically only those mini-basin with presence of convergent strata. The system selects three models in this case. The first model is to classify the geological type of the image to filter and deliver only seismic images. The second model is the mini-basing classifier. With the bounding boxes of the mini-basing, the system then applies the third model to find convergent strata patterns. The system then presents the result.

In the third possible example scenario, the user asks for all impressionist paintings of landscapes from an English painter. In a similar manner, the system selects and orchestrates three models: Painter classifier, Art movement classifier, and Genre classifier.

The system and/or method disclosed herein can support ML model injection and association with its semantic meaning description, and can map semantic description from queries to a hierarchical and contextualized set of available and suited ML models. The system and/or method can execute the selected models in query-time. In an embodiment, the system and/or method can automatically map and combine the application of machine learning models to answer queries according to semantic specification. The system and/or method can describe the related semantics and possibilities of machine learning models in the knowledge representation, process queries to extract keywords and meaning, and map to a contextualization of machine learning models; select, sort and apply selected machine learning models on selected multimodal data and conceptual symbolic representation; dynamically index multimodal data fragments and machine learning models in query time.

FIG. 1 is a diagram illustrating system architecture in an embodiment, which can implement knowledge-oriented ML-based question and answering (QA) system. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

A dashboard graphical user interface (GUI) 102 can be a user interface module or program that can support interactions between a user and an automatic processor or computer. For instance, the dashboard GUI 102 can be a browser or browser-enabled interface, or another computer application program. A user may input a search or query via the dashboard GUI 102, and the system may output a result of the search via the dashboard GUI 102.

A query parser 104 can be a natural language processing module or program that parses the query, e.g., a user-entered or user-specified search query. The query parser 104 can tokenize the search query into tokens for processing. A concept mapper 106 can be a natural language processing module or another program that can analyze the parsed query and determine one or more concepts specified in the query.

A model selector 112 can be a module or program that searches a database storing machine learning models, e.g., a non-symbolic repository 116, and selects machine learning models that are related to, or handles, the concepts determined by the concept mapper 106. The non-symbolic repository 116 also can also store any other non-symbolic or unstructured data such as documents, images, videos, and/or others.

A query engine 118 can be a computer module or program that performs search by applying combinations of the associated machine learning models, determined by the query structure. The search can be performed, for example, by running one or more selected machine learning models on unstructured data, for example, text, images, videos or other for text documents, objects such as images, videos and/or multimedia documents. Such unstructured data can also be stored in the non-symbolic repository 116. The machine learning models can be run in a contextualized order to accommodate the query. In an embodiment, the query engine is responsible for testing stored data against the selected machine learning models, which are related to the query. Input to the query engine 118 can be the list of associated ML models, and the identified concepts in the query. The query engine 118 may output the data considered relevant after classification by the ML models, which can be executed in a model orchestrator 120.

A model inspector 122 can be a computer module or program, which can extract information from an ML model, such as the model's parameters, input/output, and other signatures. Such information can be extracted from a documentation associated with the model.

A model orchestrator 120 can be a computer module or program, which can combine ML models, for example, for running selected ML models in a particular order, e.g., such that output of one model can be used as an input another model, in order to arrive at data to be presented as a search result. The model orchestrator 120 may analyze each of the selected models and determine what input and output each model takes and produces. Based on such analysis, the model orchestrator 120 may organize or determine which model to run in which order, and e.g., which model's output should be used for which model's input.

Figure 4:
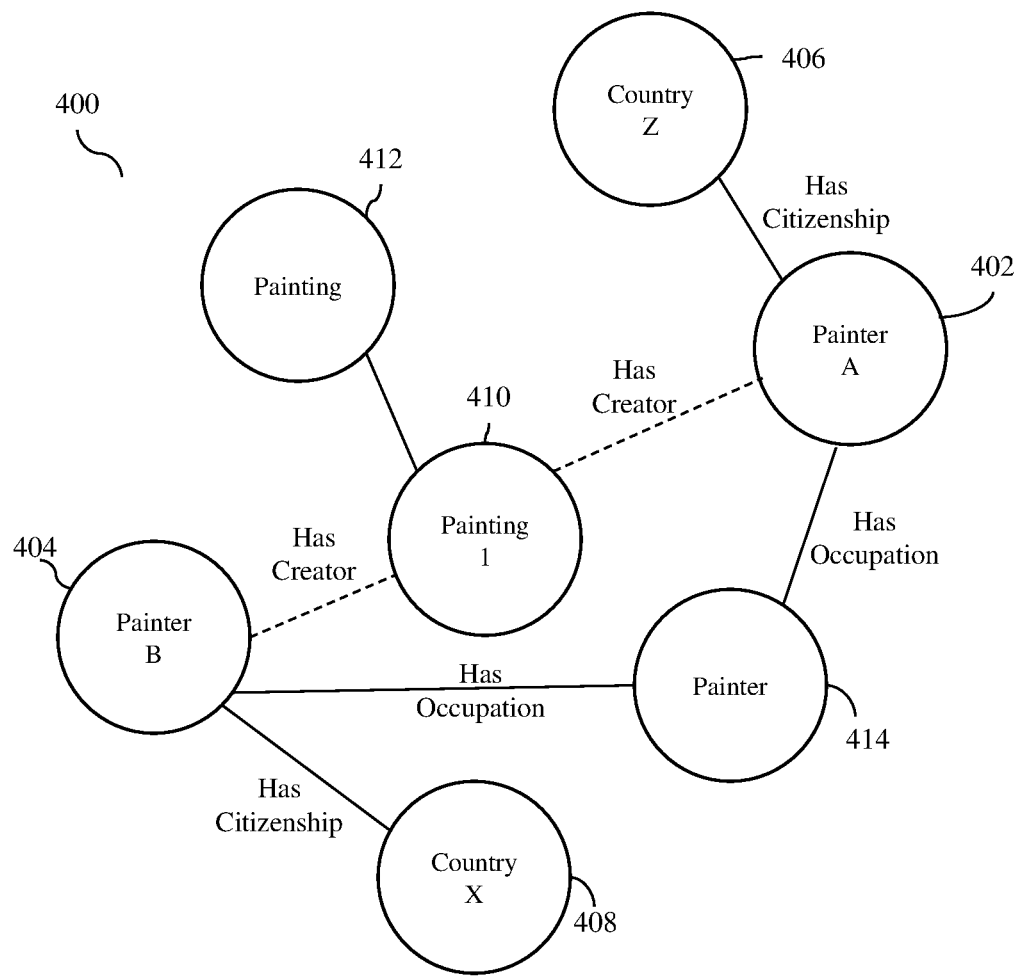
FIG. 4 is a diagram illustrating an example of a knowledge graph in an embodiment.

A knowledge graph 110 can be a data structure that includes nodes and edges, storing concepts and relationships between concepts. Nodes can represent concepts and edges connecting the nodes can represent relationships between the nodes the edges connect. In an embodiment, the edges can be weighted to represent the strength of relationships between the edges. In an embodiment, an existing knowledge graph can be used, and augmented with additional information, additional nodes and edges. In another embodiment, knowledge graph can be built, for example, using existing dictionaries or ontologies, which provide concepts and relationships between concepts. Briefly, an ontology provides a description of concepts (e.g., entities) and relationships between concepts. An example snippet of a knowledge graph is shown in FIG. 4.

Referring to FIG. 1, a knowledge structurer 108 can be a computer module or program, which builds a knowledge graph 110, or augments the knowledge graph 110 with information. An ML model identified from a non-symbolic repository 116 can be linked to a concept or node in the knowledge graph 110. In an embodiment, the knowledge structurer 108 can be in charge of creating symbolic descriptions of ML models, relating these descriptions to the concepts and relations from the ontologies in the knowledge graph. For example, the knowledge structurer 108 may create structures for models.

A graph processor 114 can perform functions on a graph, for example, the knowledge graph 110. For instance, information can be linked to the nodes in the knowledge graph such as ML models, which can work on the concepts represented by the nodes. The graph processor 114 can take the data incorporated into the answer set and structure this data and provenance aspects (the combination of ML models used) in the knowledge graph, creating corresponding symbolic descriptions.

Referring to the example scenario described above, a user may enter via the dashboard GUI 102 a search query for images of mugs with XYZ logo. The query parser 104 parses the query. The concept mapper 106 determines concepts, e.g., "mug" and "XYZ" logo, and the model selector 112 selects a set of machine learning models from the non-symbolic repository 116 that can the query. The model orchestrator 120 contextualizes and combines the execution of the machine learning models. For instance, a model that is trained to recognize images of mugs can be run to find images or bounding boxes of mug images. The model orchestrator 120 may then deliver cropped images with only the mugs to the next model, e.g., XYZ logo identifier. The output of this model can be used as a search result, e.g., presented or displayed via the dashboard GUI 102.

Similarly, referring to the second example scenario described above, a user may use the dashboard 102 to enter a query to search for seismic images where there is a convergent strata in a minibasin. The query parser 104 parses the query, the concept mapper 106 extracts concepts from the query, and the model selector 112 finds from the non-symbolic repository 116 a set of models that can handle the query. The model orchestrator 120 contextualizes and combines the running of the models. For example, the system may find seismic images with a seismic image type classifier. Then the seismic images may be delivered to a model capable of finding minibasin geological structure. The system then may deliver cropped images with only the minibasin to the next model, e.g., Convergent Strata classifier. The result can be presented or displayed via the dashboard GUI 102.

The system shown in FIG. 1 can work similarly to provide a search result for the example scenario described, which answers a query for impressionist paints of landscapes from an English painter. Different ML models such as a painter classifier, art movement classifier, and genre classifier can be selected and run in an order determined by the model orchestrator 120 to provide a result.

Figure 2:
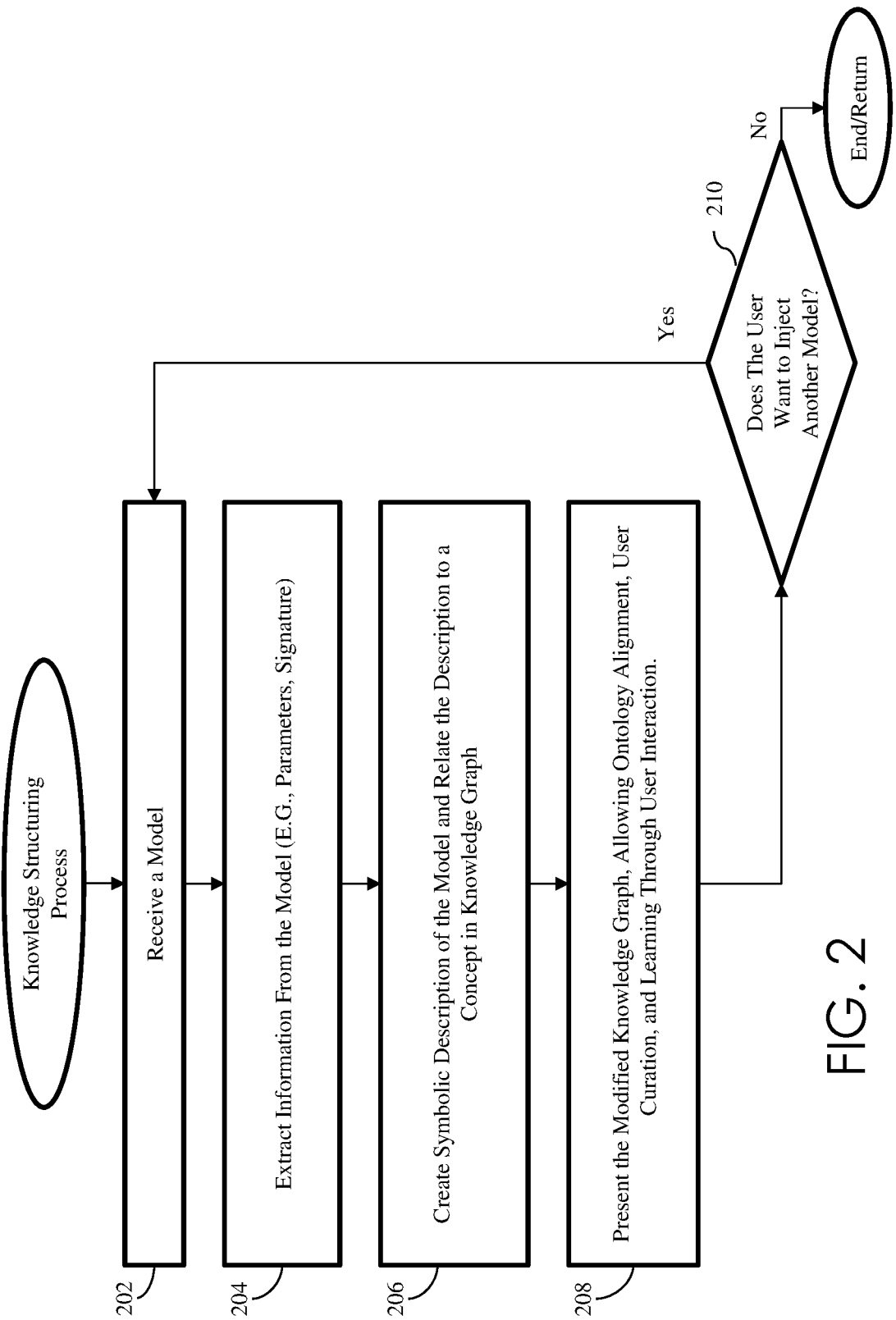
FIG. 2 is a flow diagram illustrating a method in an embodiment for model injection and knowledge structuring.

FIG. 2 is a flow diagram illustrating a method in an embodiment for model injection and knowledge structuring. The method can be run on or implemented by a computer processor, for example, including a hardware processor. At 202, a model can be received. For instance, a user may access a dashboard (e.g., 102 in FIG. 1) to inject a model. A user may specify a model (e.g., a deep learning model, a neural network, another ML model) that is trained to perform a specific task (e.g., recognizing a specific type of image, classifying a specific object, text, and/or others). The use may also specify or enter information associated with the model, for example, the inputs the model can take, the outputs the model can produce, parameters and other signatures, and other information associated with the model.

At 204, in another aspect, a computer processor may automatically extract such information about the injected model, for example, from a documentation available associated with the injected model. For example, a model inspector component or module (FIG. 1 at 122) may process the injected model to extract information from the model, e.g., parameters, signatures, and/or others. Such information can be contained in a documentation associated with the model, and the model inspector can automatically extract the information.

At 206, using the extracted information about the model, a computer processor may automatically create a symbolic description (structured description) of the model and relate this description to concepts and relations of ontologies in a knowledge graph. For instance, a knowledge graph can be built, which includes concepts and relations between the concepts. Such a knowledge graph can be represented by a data structure of nodes and connecting edges, where the nodes represent concepts and edges represent the relationships. A symbolic or structured description of the model can also be linked or connected to a concept in a knowledge graph. For example, a knowledge structurer (e.g., FIG. 1, 108) may use the extracted information to create a symbolic description of the model and relate this description to one or more concepts in the knowledge graph (e.g., FIG. 1, 110).

At 208, the modified knowledge graph can be presented. For example, a dashboard GUI (e.g., FIG. 1, 102) may display or present the modified knowledge graph, allowing ontology alignment, user curation, and learning through user interaction. For example, user may provide feedback with respect to the modified knowledge graph, further editing the knowledge graph.

At 210, it is determined whether another model is to be injected. If so, the logic continues to 202, otherwise, the logic may end or return to its calling module.

Figure 3:
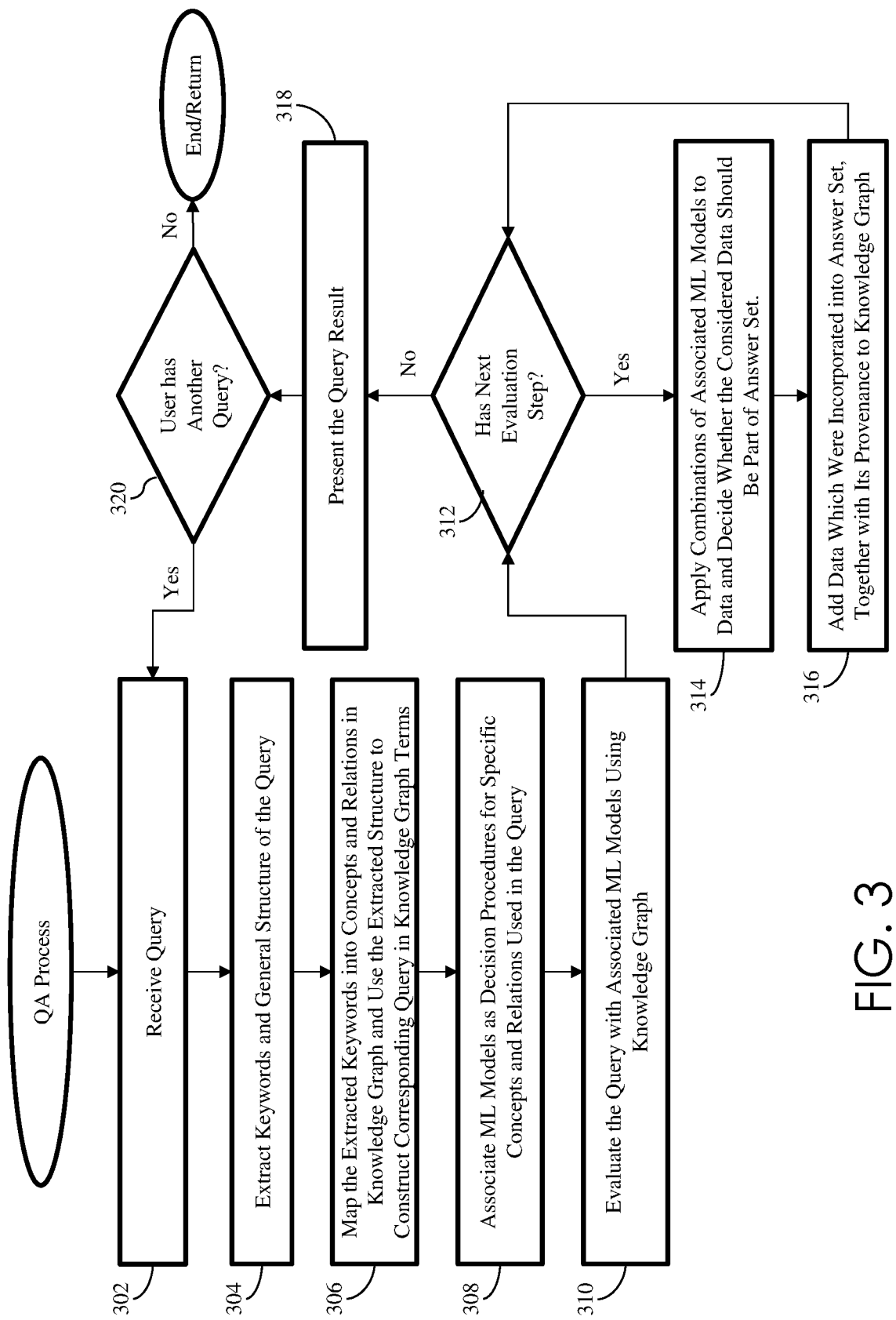
FIG. 3 is a flow diagram illustrating a method of query answering in an embodiment.

FIG. 3 is a flow diagram illustrating a method of query answering in an embodiment. The method can be run on or implemented by a computer processor, for example, including a hardware processor. At 302, a query is received. For instance, a user may access a dashboard GUI (e.g., FIG. 1, 102) to specify a query. At 304, a computer processor extracts keywords and general structure of the query, for example, using a natural language processing technique. For instance, a query parser (e.g., FIG. 1, 104) may extract keywords and the general structure of the query.

At 306, a computer processor maps the extracted keywords into concepts and relations in a knowledge graph and uses the extracted structure to construct a corresponding query in knowledge graph terms. For instance, a concept mapper (FIG. 1, 106) maps the extracted keywords into concepts and relations in the knowledge graph and uses the extracted structure to construct a corresponding query in knowledge graph terms.

At 308, a computer processor associates ML models (e.g., from a repository) as decision procedures for specific concepts and relations used in the query. For instance, a model selector (e.g., FIG. 1, 112) associates ML models (e.g., from non-symbolic repository (e.g., FIG. 1, 116)) as decision procedures for specific concepts and relations used in the query produced by a concept mapper (e.g., FIG. 1, 106).

At 310, a computer processor takes the query with associated ML models and evaluates it over a knowledge graph. The evaluation process can include zero or more evaluation steps. For instance, a query engine (e.g., FIG. 1, 118) takes the query with associated ML models and evaluates the query over the knowledge graph (e.g., FIG. 1, 110).

In an embodiment, query evaluation at 310 can include graph pattern-matching together with connectivity tests. The query itself can be represented by a graph with "holes" plus restrictions. In an embodiment, the task of the query engine is to find the nodes and edges in the target graph that fill these holes while satisfying the restrictions. Specifically, the query engine can try to find all subgraphs in the target graph that are isomorphic (or in some cases homomorphic) to the query graph.

For example, to evaluate the query "select x where {x instanceOf Person}", the query engine first transforms it into a graph "(x)-instanceOf->(Person)" with two nodes (x) and (Person) and an edge labeled "instanceOf" connecting the former to the latter. Then the query engine searches in the target graph for every node x such that there is an edge with label "instanceOf" from x to the node "Person". Any x satisfying this test is a result of the query.

More complex queries may involve connectivity tests. For instance, "select x where {x likes+B}" means not only every x such that there is a "likes" edge between x and "B" but also, because of the plus (+) operator in the query, every x such that there is a path of nonzero length of "subclass" edges connecting x and "B". The plus (+) operator introduces a connectivity test. The query in this case is asking for every x that likes B, or likes someone who likes B, or likes someone who likes someone who likes B, and so on.

In an embodiment, ML models can be used to decide whether query restrictions hold. For instance, suppose that there is an ML classifier that given an image can decide whether it depicts a person. And suppose it is desired to evaluate the query "select x where {x instanceOf Image, x depicts Person}". In this case, the query engine will try to find every x in the target graph such that there is an edge "instanceOf" from x to "Image" and "depicts" from x to "Person". Now, it might be the case that there is an image I in the target graph which is still unanalyzed—all that is known about it is the fact that it is an image. So, because the task here is to find every image with a given restriction ("depicts a person") and because there is in the ML library a model M that given an image can decide whether this restriction holds, upon considering the unanalyzed image I, the query engine may use M to decide whether there should be an edge "depicts" from I to "Person". If, when given I model, M answers "yes", in an embodiment, the query engine proceeds to add this edge to the graph (together with its provenance—that is, the fact that the edge came from the evaluation of model M) and adds I to the result set.

At 312, it is determined whether there are more evaluation steps. For instance, if there are additional question components to be answered for the query, or additional associated ML models to be run, it can be determined that there are more evaluation steps remaining. For example, conjunction in the query and composition of the MLs can be tested. As an example of conjunction, consider the query "select x where {x instanceOf Image, x depicts Person, x depicts Cat}". That is, one wants to find every image x which depicts a person and a cat. Suppose there are models $M_1$ and $M_2$ which can decide, respectively, whether a person occurs in an image and whether a cat occurs in an image. When considering an unanalyzed image I there are two restrictions that it must satisfy to be included in the result set, and each of these can be tested by the models $M_1$ and $M_2$. The query engine will include I in the result set if both $M_1$ and $M_2$ answer "yes" when applied to I, that is, if $M_1(I)\&M_2(I)$ is true. The "&" here is the conjunction operator.

As an example of composition, consider the query "select x where {x instanceOf Image, x depicts Animal, x depicts Zebra}" and suppose there are models $M_1$ and $M_2$ such that $M_1$ can decide whether an image is the image of an animal and $M_2$ can decide whether the image of an animal is actually an image of a zebra. An unanalyzed image I will satisfy this query if both models answer "yes", but the order of application of the models matter, since $M_2$ can only be applied to images of animals (an unanalyzed image I is not a proper input for $M_2$). In an embodiment, the order of evaluation is determined by the input/output restrictions of the models themselves which is described in the knowledge graph. In this case, when considering image I, the query engine first applies $M_1$ and only applies $M_2$ if $M_1$ answers "yes".

More specifically, in an embodiment, the query engine may apply the models in certain order as determined from the signatures of the models: the method can represent $M_1$ as a partial function from "Image" to "Animal" (images in general to images of animals) and $M_2$ as a partial function from "Animal" to "Zebra" (images of animals to images of zebras). In symbols, $M_1$:Image->Animal and $M_2$:Animal->Zebra. Given I of type Image, when considering the restriction "depicts a zebra" the query engine works backwards. It knows that $M_2$ can answer that query, but only if I is an image of an animal—which can be answered directly by $M_1$. So, the query engine will include I in the result set if $M_2(M_1(I))$ is defined, that is, if the composition $(M_2*M_1)$(I) is defined. By definition of function composition, the latter is undefined if $M_1(I)$ is undefined.

If there are more evaluation steps, at 314, a computer processor applies combinations of the associated ML models (determined by the query structure) to data in a repository and decides whether the considered data should be part of the result set. For example, a query engine (e.g., FIG. 1, 118) uses a model orchestrator (e.g., FIG. 1, 120) to apply combinations of the associated ML models (determined by the query structure) to data in non-symbolic repository (e.g., FIG. 1, 116) and decides whether the considered data should be part of the result set.

At 316, a computer processor takes the data which were incorporated into the result set and adds this data together with its provenance (the combination of ML models used to classify it) to a knowledge graph, creating corresponding symbolic descriptions. For instance, a graph processor (e.g., FIG. 1, 114) takes the data which were incorporated into the result set and adds this data together with its provenance (the combination of ML models used to classify it) to the knowledge graph (e.g., FIG. 1, 110), creating corresponding symbolic descriptions.

If at 312, there are no other evaluations to be performed, at 318, a computer processor presents the query results (final result set), allowing for further ontology alignment, user curation, and learning through user interaction. For instance, the user may provide feedback as to the query result. Based on the feedback, one or more of the ML models and knowledge graph may be modified. The query result, for example, can be presented or displayed via a dashboard GUI (e.g., FIG. 1, 102).

At 320, if there is another query to process, the logic proceeds to 302. Otherwise, the logic can end or return to a calling process.

The method in an aspect performs query answering through a dynamic, semantic-guided combination of machine learning models which are applied incrementally (at query time) to data fragments described in a contextualized knowledge graph.

FIG. 4 is a diagram illustrating an example of a knowledge graph in an embodiment. Nodes of the knowledge graph 400 represent concepts and edges can represent relationships. By way of example, specific painter nodes (e.g., including proper name or identifier of a specific painter) 402, 404 can have relationships (has citizenship) with specific country nodes 406, 408. Specific painter nodes 402, 404 can also have relationships (has occupation) with an occupation node "painter" 414. A specific painting node (e.g., can be referred to by a name or title or another identifier and can include information such as the genre or type and other information) 410, can have a relationship (e.g., subConceptOf) with an object node "painting" 412. The specific painting can also have a relationship (e.g., has creator) with a specific painter node (e.g., 402 or 404). In an embodiment, based on a search, the knowledge graph 400 can be updated. For instance, via the search, it may be discovered that "Painter A" 402 is a creator of "Painting 1" 410. In this scenario, the knowledge graph 400 can be updated to include a relationship "Has Creator" between "Painter A" 402 and "Painting 1" 410.

Figure 5:
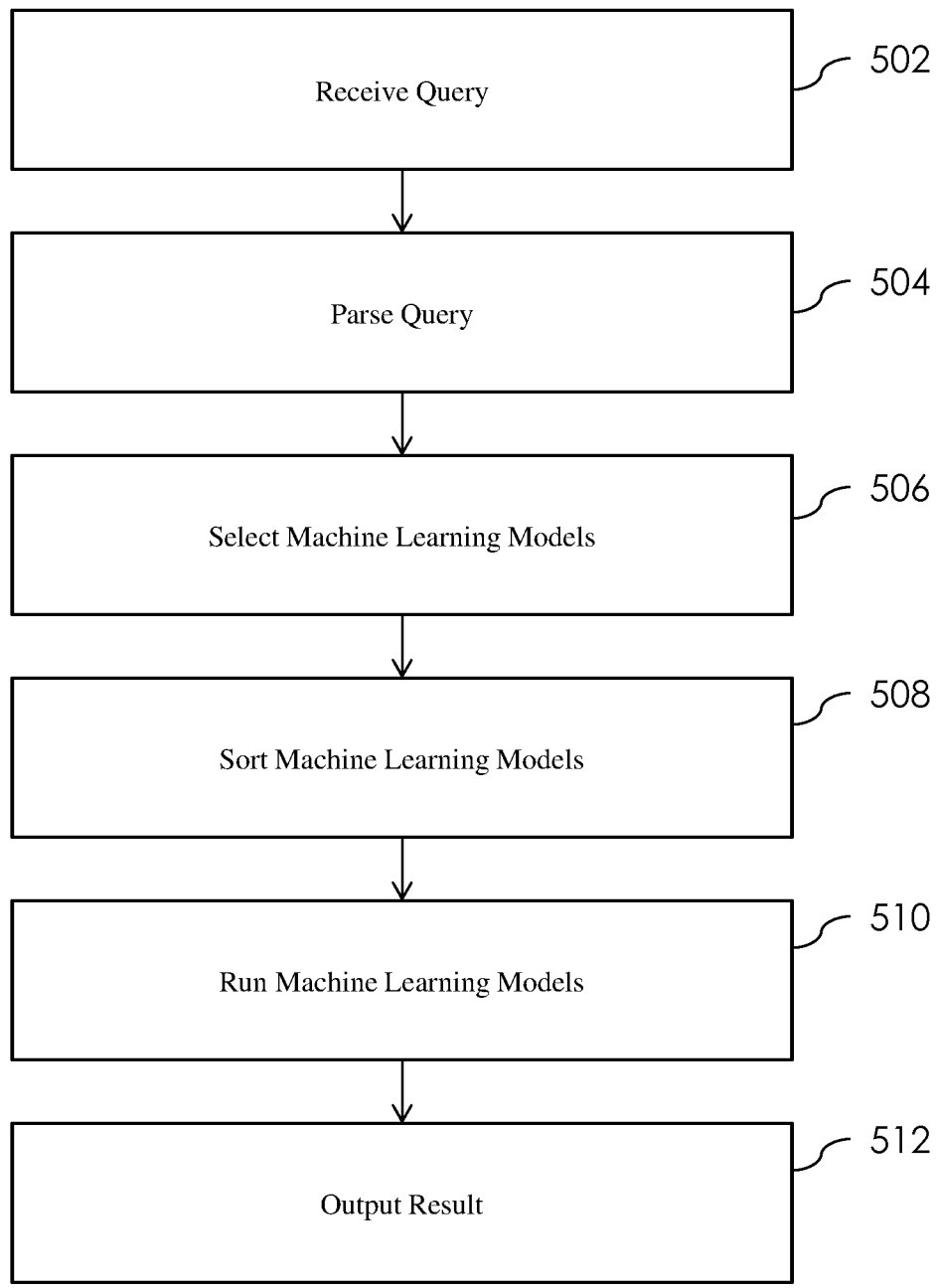
FIG. 5 is another flow diagram illustrating a method in an embodiment.

FIG. 5 is another flow diagram illustrating a method in an embodiment. The method can be run on or implemented by a computer processor, for example, including a hardware processor. At 502, a query can be received. For example, a user via a user interface or graphical user interface can specify a question or query to a computer, for example, in search of an answer or response to the query. At 504, using a natural language processing technique, a processor or a computer processor parses the query and extracts keywords used in the query. The processor also contextualizes the query by semantically analyzing the structure of the query. In an embodiment, the keywords are mapped to concepts in a knowledge graph and the query can be contextualized according to relationships of the concepts in the knowledge graph.

At 506, based on the keywords, the processor searches for and identifies, or selects, machine learning models that can handle or process concepts associated with the keywords. For example, a machine learning model that handles a concept associated with a keyword in the query, another machine learning model that handles another concept associated with another keyword in the query, and so on, can be identified or selected. In an embodiment, the machine learning models are selected from a repository that contains trained machine learning models. Examples of machine learning models can be neural networks, deep learning networks, and other unsupervised machine learning models, semi-supervised machine learning models, supervised machine learning models, and/or others. In an embodiment, the machine learning models can be linked to, or associated with, respective concepts in the knowledge graph. In an embodiment, by way of example, the machine learning models can include machine learning classifiers, each machine learning model trained to classify a specific object. For instance, each model can perform a different classification.

At 508, the processor or computer processor sorts the machine learning models according to the contextualized query or contextualization. For instance, if a query includes a search for images of an item displaying a specific logo within the item, and a machine learning model that classifies images of the item and another machine learning model that classifies images of the logo are selected, the processor may determine to sort the machine learning models in the order of the machine learning model that classifies images and the machine learning model that classifies images of the logo.

At 510, the processor or computer processor runs the machine learning models on multimodal unstructured data according to the sorted order, where the data resulting from the output of one of the machine learning models can be used as an input to another one of the machine learning models. Examples of the multimodal data can include, but not limited to, text data, audio data, video data and image data. By way of example, a first of the machine learning models may take as input the multimodal unstructured data and classify that data. Images classified by the first of the machine learning models as containing the item or object being searched for can be cropped and input to a second of the machine learning models to further classify that input for a desired outcome. In an embodiment, composition is used in any case where the output of one model serves as input for another model as in the case where one model crops the relevant part of the image which is then fed to a second or another model. For instance, in the example involving images of animals and zebras described above, instead of simply answering yes or no when given an image of an animal, model $M_1$ could create a new image J by cropping the part in which the animal appears in the original image I and answering yes for J. The new image J would then be fed to $M_2$ and, in case it is the image of a zebra, J would be included in the result set. This can be described backwards: I might not be the image of a zebra but might contain an image of a zebra. One way of finding a proper input for $M_2$ is to consider the subimages of I using model $M_1$. At 512, a search result is output based on running the machine learning models in the sorted order.

Figure 6:
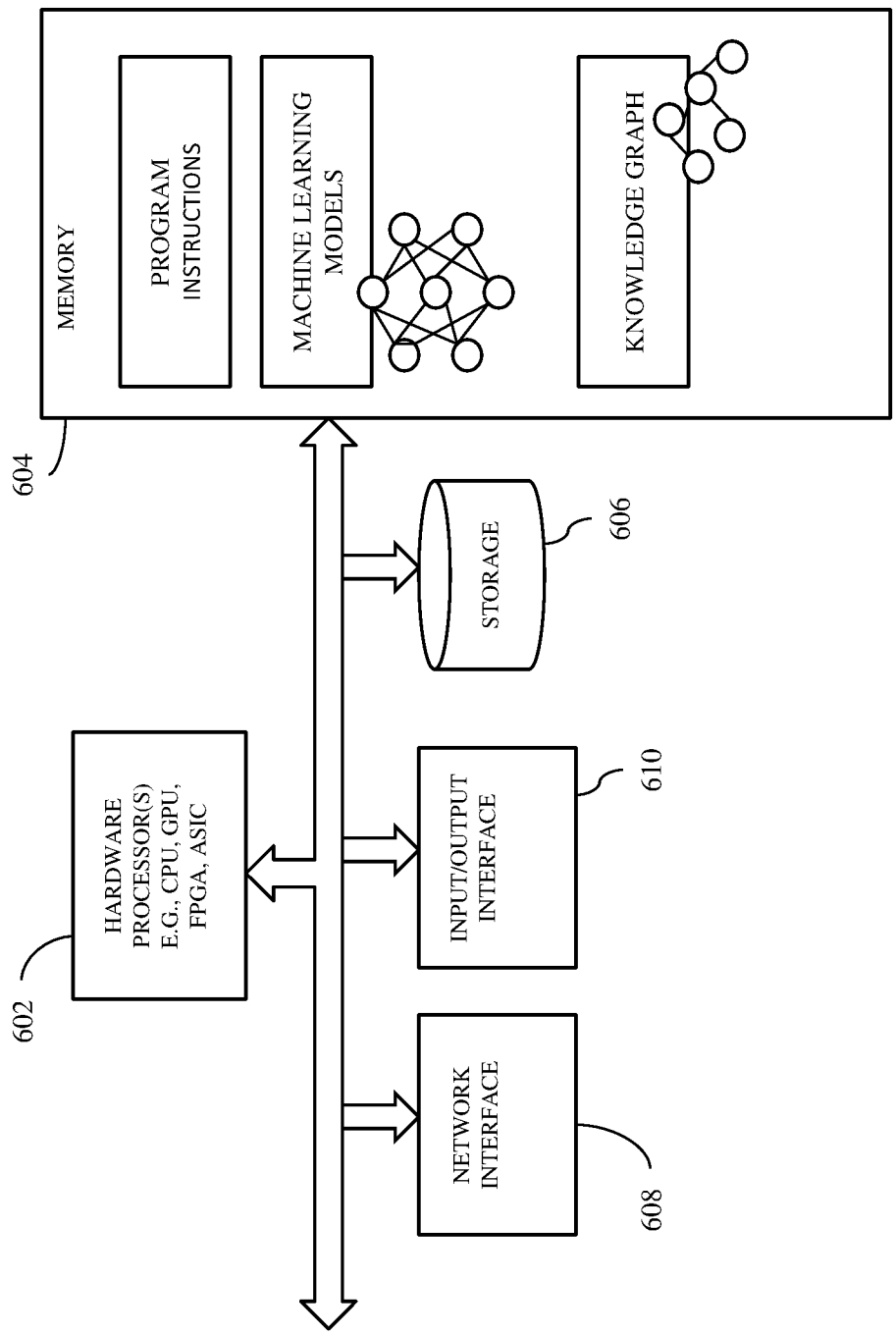
FIG. 6 is a diagram showing components of a system in one embodiment that can automatically map and combine the application of machine learning models to answer queries according to semantic specification.

FIG. 6 is a diagram showing components of a system in one embodiment that can automatically map and combine the application of machine learning models to answer queries according to semantic specification. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and perform query answering using machine learning models according to the semantics of the query. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including unstructured and/or multimodal data, for example, for one or more machine learning models to classify, for answering the query. In one aspect, unstructured or non-symbolic multimodal data may be stored in a storage device 606 or received via a network interface 608 from a remote device, and may be temporarily loaded into a memory device 604 for classification. One or more machine learning models may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
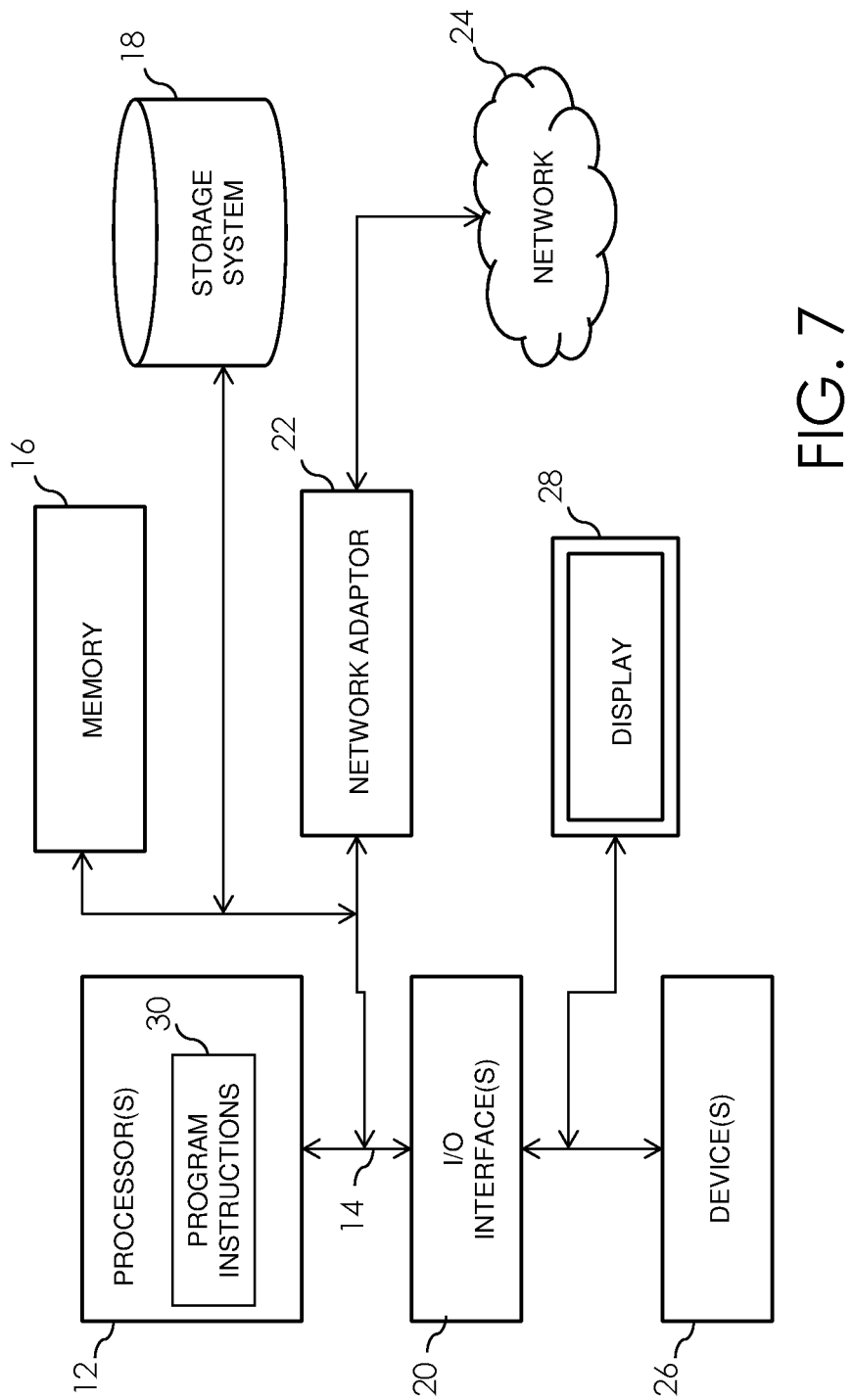
FIG. 7 illustrates a schematic of an example computer or processing system that may implement a system in one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
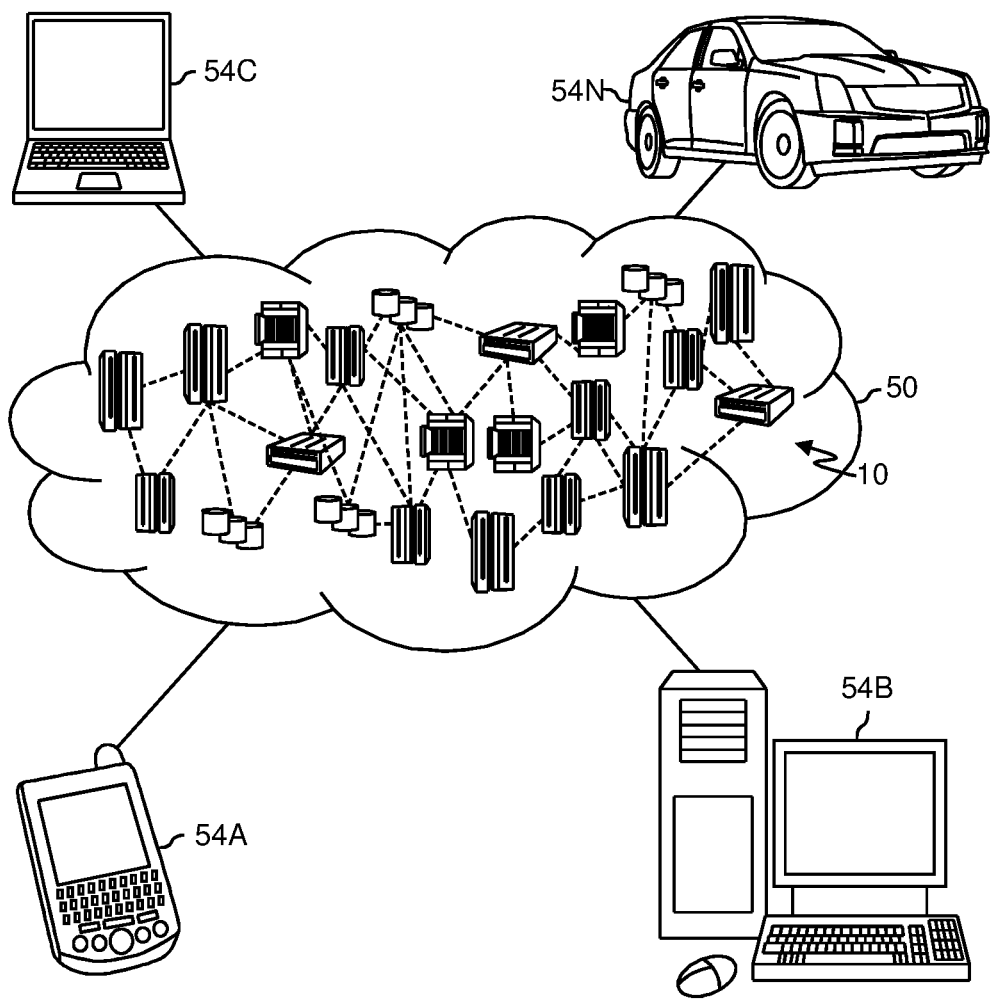
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
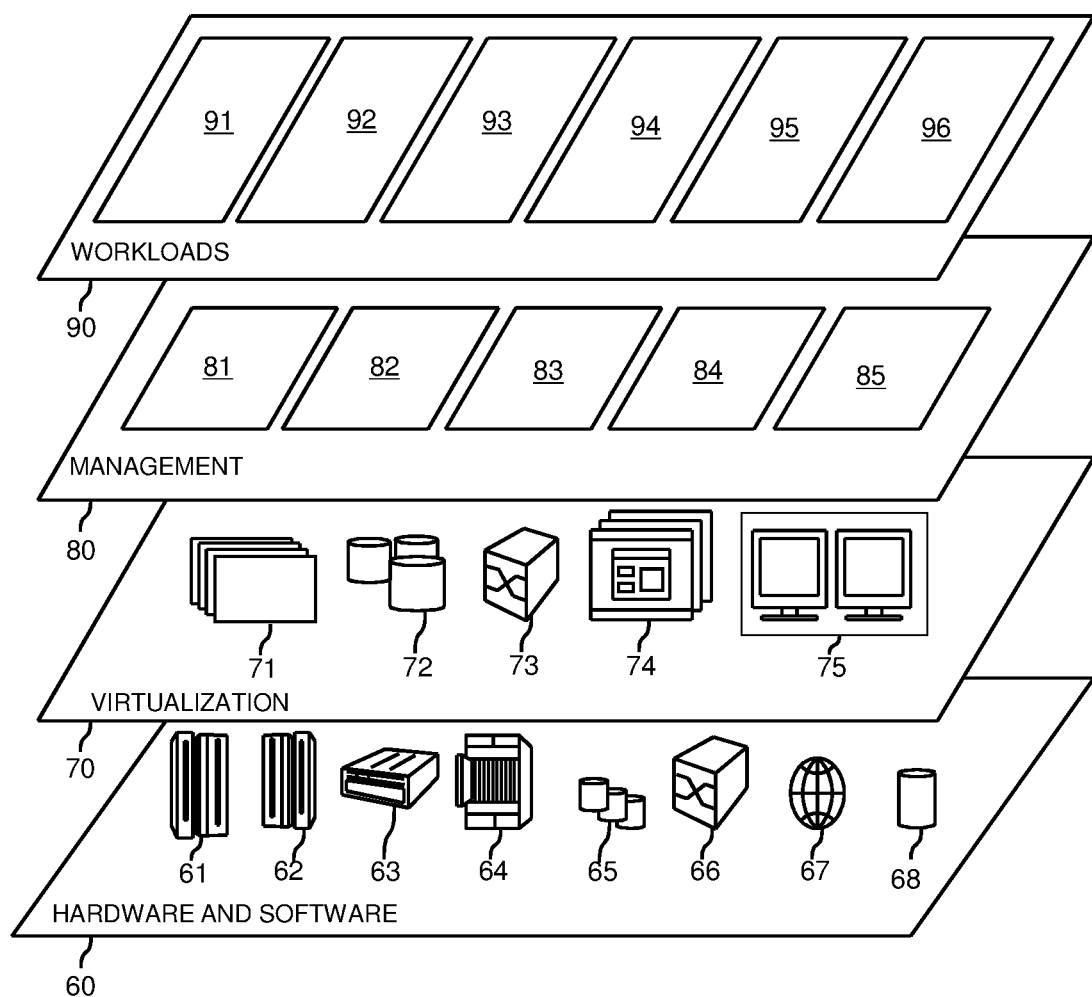
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query answering processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a query;
parsing the query to extract keywords from the query and to contextualize the query;
based on the keywords, selecting machine learning models that are trained to process concepts associated with the keywords, different machine learning models in the machine learning models selected to respectively handle different conceptual parts of the query;
sorting the machine learning models that are selected according to the contextualization of the query, the contextualization of the query identifying multimodal data fragments of the query, and at least one of the machine learning models that are selected handling a mode of data fragment of the query that is different from another mode of data of the query handled by another of the machine learning models that are selected, the sorting determining which selected machine learning model's output is to be used for which selected machine learning model's input among the machine learning models;
running the machine learning models that are selected on multimodal unstructured data according to a sorted order, the running the machine learning models applying the machine learning models that are trained, wherein output data that is output by one of the machine learning models in the sorted order is input as input data to a next one of the machine learning models in the sorted order; and
outputting a query result based on a result from running the machine learning models in the sorted order.

2. The method of claim 1, wherein the keywords are mapped to concepts in a knowledge graph and the query is contextualized according to relationships of the concepts in the knowledge graph.

3. The method of claim 1, further including linking the machine learning models to respective concepts in the knowledge graph.

4. The method of claim 1, wherein the multimodal data includes text data, audio data, video data and image data.

5. The method of claim 1, wherein the machine learning models are selected from a repository of trained machine learning models.

6. The method of claim 1, wherein the machine learning models are transformed into a structured symbolic form by extracting information associated with the machine learning models.

7. The method of claim 1, wherein the machine learning models includes machine learning classifiers, each trained to classify a specific object.

8. The method of claim 7, wherein cropped images resulting from the output of said one of the machine learning models is used as the input to said another one of the machine learning models.

9. A system comprising:
a processor;
a memory device coupled with the processor;
the processor configured to:
receive a query;
parse the query to extract keywords from the query and to contextualize the query;
based on the keywords, select machine learning models that are trained to process concepts associated with the keywords, different machine learning models in the machine learning models selected to respectively handle different conceptual parts of the query;
sort the machine learning models that are selected according to the contextualization of the query, the contextualization of the query identifying multimodal data fragments of the query, and at least one of the machine learning models that are selected handling a mode of data fragment of the query that is different from another mode of data of the query handled by another of the machine learning models that are selected, sorting of the machine learning models determining which selected machine learning model's output is to be used for which selected machine learning model's input among the machine learning models;
run the machine learning models that are selected on multimodal data according to a sorted order, the running the machine learning models applying the machine learning models that are trained, wherein output data that is output by one of the machine learning models in the sorted order is input as input data to a next one of the machine learning models in the sorted order; and output a query result based on a result from running the machine learning models.

10. The system of claim 9, wherein the keywords are mapped to concepts in a knowledge graph and the query is contextualized according to relationships of the concepts in the knowledge graph.

11. The system of claim 9, wherein the processor is further configured to link the machine learning models to respective concepts in the knowledge graph.

12. The system of claim 9, wherein the multimodal data includes text data, audio data, video data and image data.

13. The system of claim 9, wherein the machine learning models are selected from a repository of trained machine learning models.

14. The system of claim 9, wherein the machine learning models are transformed into a structured symbolic form by extracting information associated with the machine learning models.

15. The system of claim 9, wherein the machine learning models includes machine learning classifiers, each trained to classify a specific object.

16. The system of claim 9, wherein cropped images resulting from the output of said one of the machine learning models is used as the input to said another one of the machine learning models.

17. A computer program product comprising a computer readable storage medium having program instructions embodied therewith, the program instructions readable by a device to cause the device to:

receive a query;

parse the query to extract keywords from the query and to contextualize the query;

based on the keywords, select machine learning models that are trained to process concepts associated with the keywords, different machine learning models in the machine learning models selected to respectively handle different conceptual parts of the query;

sort the machine learning models that are selected according to the contextualization of the query, the contextualization of the query identifying multimodal data fragments of the query, and at least one of the machine learning models that are selected handling a mode of data fragment of the query that is different from another mode of data of the query handled by another of the machine learning models that are selected, sorting of the machine learning models determining which selected machine learning model's output is to be used for which selected machine learning model's input among the machine learning models;

run the machine learning models on multimodal data according to a sorted order, the running the machine learning models applying the machine learning models that are trained, wherein output data that is output by one of the machine learning models in the sorted order is input as input data to a next one of the machine learning models in the sorted order; and output a query result based on a result from running the machine learning models.

18. The computer program product of claim 17, wherein the keywords are mapped to concepts in a knowledge graph and the query is contextualized according to relationships of the concepts in the knowledge graph.

19. The computer program product of claim 17, wherein the device is further caused to link the machine learning models to respective concepts in the knowledge graph.

20. The computer program product of claim 17, wherein the multimodal data includes text data, audio data, video data and image data.

* * * * *